Patented Feb. 6, 1923.

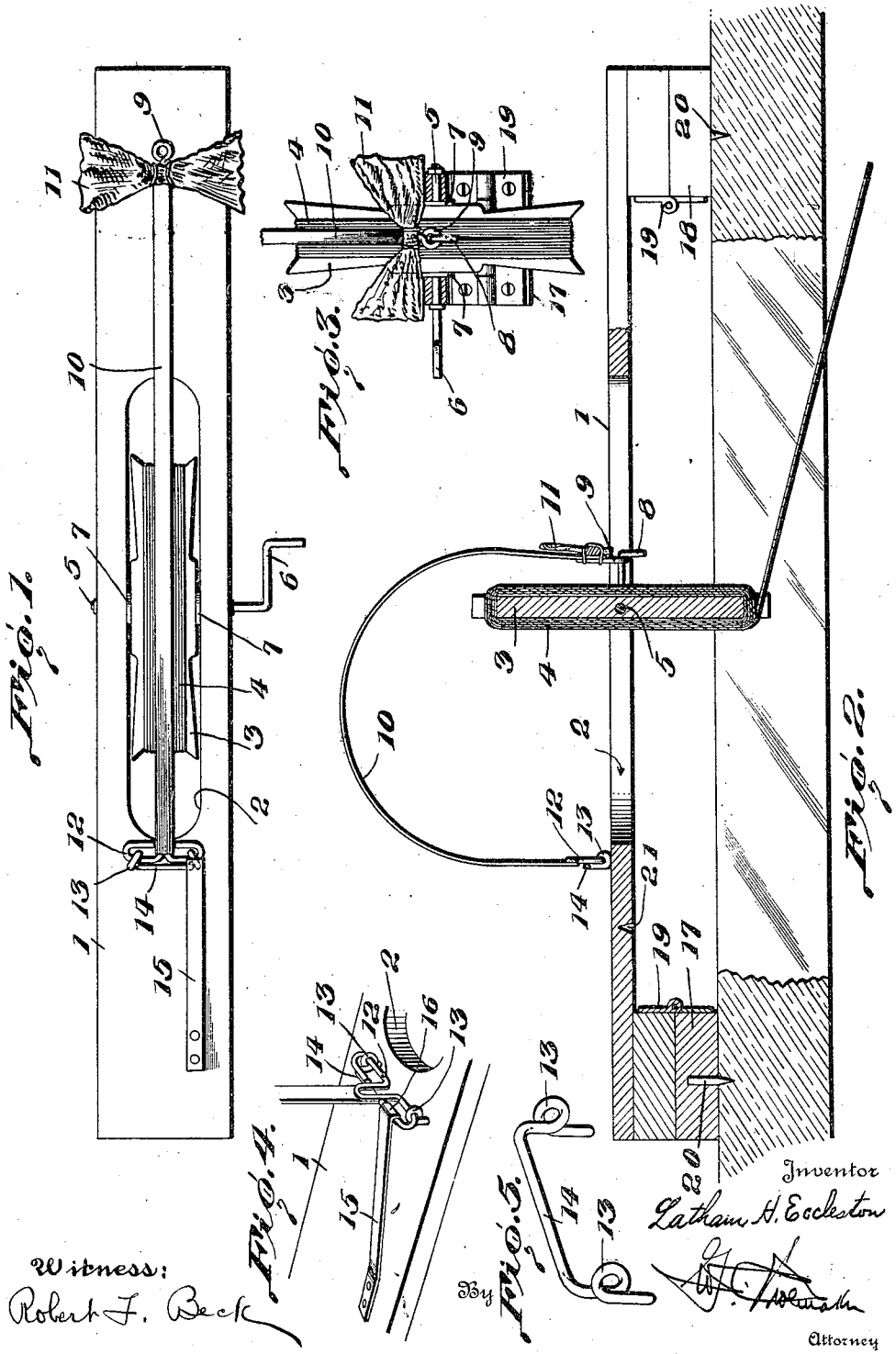

1,443,981

UNITED STATES PATENT OFFICE.

LATHAM H. ECCLESTON, OF WAKEFIELD, RHODE ISLAND, ASSIGNOR OF ONE-HALF TO HOWARD B. PERRY, OF WAKEFIELD, RHODE ISLAND.

APPLIANCE FOR FISHING THROUGH THE ICE.

Application filed April 12, 1921. Serial No. 460,708.

*To all whom it may concern:*

Be it known that I, LATHAM H. ECCLESTON, a citizen of the United States, residing at Wakefield, in the county of Washington and State of Rhode Island, have invented new and useful Improvements in Appliances for Fishing Through the Ice, of which the following is a specification.

The invention relates to an appliance for fishing through the ice and particularly to that class of devices which are equipped with a movable signal which is released and displayed automatically when the fish takes the bait and pulls on the fishing line.

The object of the invention is to provide a simple, practical and efficient fishing appliance of this character which will be strong, durable and comparatively inexpensive in construction and adapted to be compactly folded when not in use and capable of being readily set for use in a firm position upon the ice without making holes in the ice for anchoring purposes.

Another object of the invention is to provide a fishing appliance which will lie low upon the ice and the condition of which may be readily ascertained at a glance at a distance so that it will not be necessary for a person to closely examine the device to ascertain whether or not the same has been sprung.

With these and other objects in view, the invention consists in the novel construction, combination and arrangement of parts hereinafter fully described, illustrated in the accompanying drawing and pointed out in the claims hereto appended, it being understood that various changes in the form, proportion and minor details of construction, within the scope of the claims, may be resorted to without departing from the spirit or sacrificing any of the advantages of the invention:

In the drawings in which like characters of reference designate corresponding parts in the several figures:

Figure 1 is a plan view of a fishing appliance constructed in accordance with this invention and shown folded.

Figure 2 is a longitudinal sectional view of the same, the fishing appliance being set for use.

Figure 3 is a central transverse sectional view of the same.

Figure 4 is a detail transverse sectional view illustrating the manner of hinging and locking the resilient signal carrying arm or member.

Figure 5 is a detail view of the combined stop and hinge element.

In the accompanying drawing in which is illustrated the preferred embodiment of the invention, the fishing appliance comprises in its construction a substantially oblong support or holder 1 constructed of wood or any other suitable material and provided with a central longitudinal slot 2 in which operates a reel 3 adapted to have a fishing line 4 wound upon it and mounted upon a transverse shaft 5. The shaft 5 is extended at one end and bent to form a clip 6 for operating the shaft to wind up the line on the reel. The reel may be of any desired construction and it is preferably spaced from the side walls of the slot by suitable washers 7. This reel which is oblong is adapted to be arranged longitudinally of the slot 2 as clearly illustrated in Figure 1 of the drawing when it is desired to fold the device.

The reel is equipped at its center with a substantially L-shaped hook 8 having its bill or engaging portion extending downwardly when the reel is in an upright position as illustrated in Figure 2 of the drawings and the said hook is adapted to engage an eye 9 of a resilient signal carrying arm or member 10 which is maintained in a bowed or downwardly bent position when the trap is set and which is automatically released when the trap is sprung by a fish taking the bait and pulling on the line. This action causes a rotary movement of the reel and carries the L-shaped hook upwardly and permits the resilient signal carrying arm to spring out of engagement with the hook and assume the upright position shown in dotted lines in Figure 2. The resilient arm or member is designed to be provided with a suitable signal 11 which is preferably in the form of a flag of red or other color of the form shown, but the size and form of the signal may of course be varied as will be readily understood.

The resilient signal-carrying arm which is shown in the accompanying drawing as a flat spring may be constructed of any other suitable material such as wire and it is provided at the end opposite that having the eye 9 with laterally extending pintle arms 12 which are bent inwardly to form loops or eyes which are linked into eyes 13 of a combined stop and hinge element constructed of a single piece of wire or other suitable material which is bent at spaced points from the center to form an approximately U-shaped loop or stop 14 and the side portions of the wire or other material are coiled to form the eye or hinge elements 13 while the terminals of the wire are passed through the support or holder and clinched at the under side thereof. The resilient signal-carrying arm by being linked into the eye 13 is hinged at the inner side of the stop loop 14 and it is adapted to be held firmly against the loop by a catch 15 consisting of a flat spring secured at one end to the upper face of the holder or support adjacent to one end thereof and having its other end free and bent downwardly to form a lip or engaging portion 16 which engages over one of the laterally extending eyes or loops of the resilient signal-carrying arm or member. The spring catch detachably maintains the hinged end of the signal-carrying arm or member in locked position against the stop so that when the free end of the resilient arm is released by a fish pulling upon the line the signal will spring upward and maintain an upright position so as to indicate that the trap is sprung. When it is desired to fold the fishing appliance the catch 15 is lifted out of engagement with the laterally extending loop or resilient arm and the latter is swung downwardly and is adapted to lie flat against the holder and the reel 1 is turned to carry the hook to the bottom of the holder and present a flat upper surface to the signal-carrying arm.

The holder is equipped at each end with a pair of fixed and hinged blocks 17 and 18. The block 17 at each end of the holder is rigidly secured to the lower face of the same and the folding block 18 is connected to the fixed block 6. A hinge 19 which permits the folding block to swing downwardly and outwardly from the dotted line position shown in Figure 2 to the full line position and the hinged blocks are provided with projecting spurs 20 located at the lower faces of the hinged blocks when the latter are swung downwardly and outwardly and to the inner or upper faces of the block 18 when the same are swung upwardly or folded. These studs are adapted to be embedded in the ice and will hold the appliance firmly in position for use and obviate the necessity of digging holes into the ice and anchoring the appliance by fastening means which are liable through thawing at the holes to release the appliance. Also by mounting the reel in a central position in the manner shown there will be no liability of the fishing line freezing to the adjacent ice and interfering with the operation of the appliance. The support or holder is designed to be provided in its lower face with indentations 21 to receive the projecting spurs 20 when the blocks 18 are folded.

What is claimed is:

1. A fishing appliance including a support or holder, a reel mounted on the support or holder, a resilient signal-carrying arm hinged to the support or holder and adapted to fold flat against the same, a releasable catch rigidly secured to the support or holder and arranged to engage the resilient signal-carrying arm adjacent to the hinge thereof to form a rigid connection between the arm and the support or holder and a reel mounted in the support or holder and provided with means for engaging the free end of the signal-carrying arm, the latter being adapted to be released by rotary movement of the reel.

2. A fishing appliance of the class described including a support or holder, a reel mounted in the support or holder, a combined hinge element and stop provided at opposite sides with eyes, a resilient signal-carrying arm having laterally projecting loops linked into the said eyes, a catch arranged to engage one of the eyes or loops of the signal carrying arm for holding the same against the stop and means carried by the reel for maintaining the resilient arm in a bowed position to set the appliance.

3. A fishing appliance of the class described including a support or holder provided with fixed blocks, folding blocks provided with spurs and hinged to the fixed blocks and adapted to swing beneath the same to expose the spurs and adapted also to swing to a position beneath the holder and in alinement with the fixed blocks to conceal the spurs.

In testimony whereof I have hereunto set my hand.

LATHAM H. ECCLESTON.